July 3, 1951 W. T. DARRACH 2,558,934
METHOD FOR CORRECTING MAGNETIC COMPASSES ON CARRIERS
Filed April 19, 1947 2 Sheets-Sheet 1

INVENTOR.
Walter T. Darrach

Patented July 3, 1951

2,558,934

UNITED STATES PATENT OFFICE 2,558,934

METHOD FOR CORRECTING MAGNETIC COMPASSES ON CARRIERS

Walter T. Darrach, Philadelphia, Pa.

Application April 19, 1947, Serial No. 742,540

2 Claims. (Cl. 73—1)

My invention relates to a novel method and instrument to be used jointly with the magnetic compass of a carrier such as an airplane, seaplane, dirigible, land vehicle or water-borne vessel for the purpose of heading the carrier directly in line with the earth's force or at any determined angle to that force.

Practically all carriers, except those designed to be nonmagnetic, have degrees of permanent and subpermanent magnetism due to magnetic substances contained within the carriers, such as steel, and in addition varying degrees of induced magnetism in horizontal soft iron if same is contained within the carrier. The effect of these magnetic fields on the lines of the earth's force is such that they produce varying degrees of error in the magnetic compass of each carrier depending upon the direction in which the carrier is headed. Methods have been developed for adjusting permanent magnets near or beneath the compass to compensate for the errors due to permanent and subpermanent magnetism and for adjusting large balls of soft iron near the compass to correct for errors due to induced magnetism. In making such adjustments, it is necessary first to determine the compass error. By the prevailing methods, it is considered necessary to know the magnetic bearing of a distant object. The methods of the past for determining the correct magnetic bearing of a distant object have been time-consuming or requiring the special skill of experienced operators. When this bearing is determined and compared with the compass bearing of the object, the difference denotes the compass error. The addition or adjustment of compensating magnets or the soft iron balls about the compass in order to deflect the compass to show the correct bearing corrects the error. By this prevailing method when using the sun or any celestial body as the distant object, the following data must be known and computed to find the magnetic bearing of that object; the latitude and longitude of the carrier, the variation, the declination, the exact civil time, the mean time at the carrier, the equation of time for the particular date, and the apparent time. The usual time required to correct a compass by this process has been about two hours. By my invention described herein, compasses on carriers having only permanent and subpermanent magnetism may be corrected in about 15 minutes, while compasses on carriers having also induced magnetism may be corrected in about 30 minutes. By my invention, the need for determining the correct magnetic bearing of a distant object is avoided.

Another object of this invention is to provide a method which anyone with little experience can operate efficiently to determine the correct course of a carrier. Still another object is to provide a method which anyone with little experience can use to adjust the compensating magnets about the compass in order to correct for permanent and subpermanent magnetism of the carrier and to adjust the soft iron balls on each side of the compass to correct for induced magnetism in horizontal symmetrically disposed soft iron contained in the carrier. A further object is to provide a method for quickly determining the correct reading of the lines of the horizontal component of the earth's directive force with respect to the direction of the carrier while the carrier is in use in normal travel. It is a final object of this invention to provide a method for determining compass error that is not dependent upon the magnetic bearing of a distant object, thus eliminating the necessity for computing data to find the magnetic direction of the sun (when that body is used as a distant object) from the geographical location of the carrier. These objects are accomplished by the following described instrument known as a compass corrector and its method of use.

The new and improved compass corrector is more particularly described with reference to the accompanying drawings.

Figure 2:
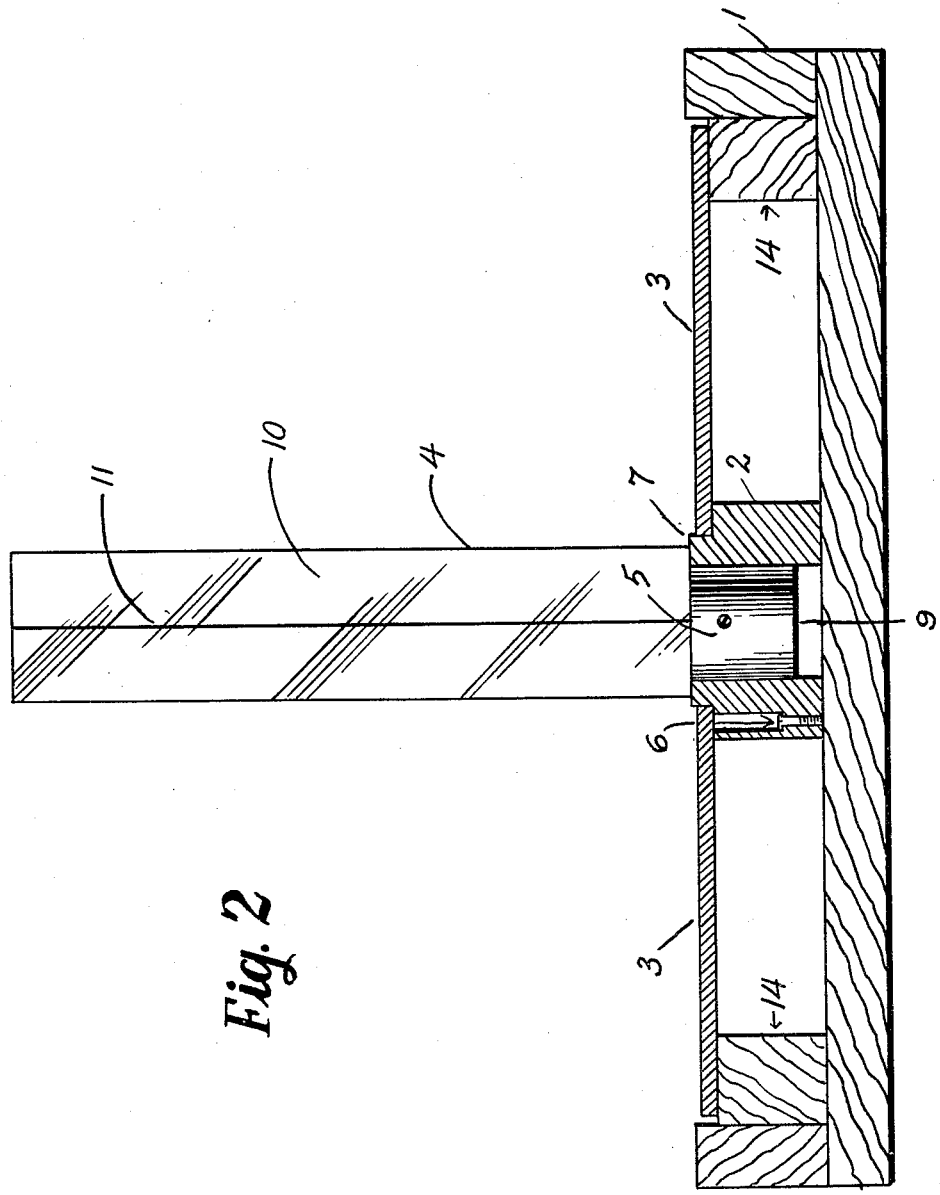
Figure 2 is an elevated sectional view of the instrument.

Referring particularly to Figure 2, the numeral 1 designates the lower half of the instrument case which also forms the base of the instrument.

A nonmagnetic metal hub 2 is fastened with screws 6 at the center of the base 1. On this hub 2 rests dial 3, said dial being held in position by the vertical upper flange 7 of the hub 2, which flange passes through a center hole 8 of the dial 3. The size of the hole 8 and the flange 7 are such as to allow dial 3 to be turned in azimuth. The shaft 5 of the removable vertical shadow pin 4 is inserted in the central vertical hole 9 of hub 2. In the construction of what I term the shadow pin 4, I prefer to use an oblong segment 10 of clear plastic such as "plexiglas" fastened to the shaft 5. The clear plastic should be approximately ⅛ to 3/16-inch thick and so fastened to the base that the opaque or semi-opaque line 11 drawn through its lengthwise center becomes the vertical axis through the center of dial 3, the center of hole 9 and the center of shaft 5. The plastic segment 10 can be attached to the shaft 5 by any means, such as cementing same in a slot in the metal shaft. Holes 12 may be cut in dial 3 to assist in turning the dial about the perpendicular axis coinciding with line 11. In place of holes 12, one or more small knobs may be used. Supports 14 may be placed in the instrument case 1 to assist in keeping the dial 3 in a plane perpendicular to the line 11. The dial 3 may be held in position after setting by the normal friction which exists between it and the hub 2 as well as between the dial and the supports 14. If this friction is not sufficient to hold the dial in a fixed relationship with the base, any friction increasing means such as a clamp or a setscrew may be added to the instrument. The object of such modification, of course, is to permit the free turning of the dial when desired in the manner as will be described below and the ability to fix the dial with respect to the carrier so that it will not turn but will permit the determining of the degree of rotation of the carrier. The entire instrument should, of course, be made of non-magnetic material.

It will be seen that the scale 13, marked in degrees on dial 3, is so marked on one semicircle only. It is not necessary that the scale cover the entire semicircle, but can be limited to only a portion thereof, provided it is sufficient to be used for denoting compass error as will be described hereinafter. It will be noted that the scale starts with zero in the center and has degree markings increasing in degrees on both the right and left of the center zero. Also, it will be noted that a line from zero of said scale is continued across the full diameter of the dial 3. On the semicircle not marked in scale, this line 16 is hereafter termed the 0—0 line or the shadow line.

The above description of the instrument denotes the structural details of the preferred embodiment of my invention to be used for correcting a compass with the rays of the sun by causing a shadow of line 11 to be cast on dial 3. Obvious modifications can be made with respect to pin 4. Such modifications may include the use of a wire in place of the line 11 and the use of a frame for holding the wire in place of the clear plastic glass. Also, a piece of opaque non-magnetic substance with a slit in place of the line 11 can be used. With such a modification, a line of light instead of a line of shadow will be thrown on the dial 3.

To correct semicircular error of a compass in a carrier, that is, error due to a permanent and subpermanent magnetism contained within the carrier, the instrument described above is placed on the carrier in a level position and exposed to the rays of the sun. The carrier is headed on a cardinal point by compass, say, for example, west. The dial 3 is then turned so that the shadow of line 11 as made by the sun falls on the shadow line 16 of dial 3. The zero of the scale 13 is now pointing to the sun. Without changing the position of the instrument or moving the dial, the carrier is now reversed so that it heads toward the opposite cardinal point (east) by compass. In so heading, the carrier has been turned 180° by compass. The shadow of line 11 will now fall on scale 13 and the compass error when headed either east or west is one-half the number of degrees indicated by the shadow on the scale. By this simple operation, the compass error for two cardinal points is determined.

In order to correct the compass for these cardinal points east and west, the carrier is shifted in a direction that will cause the shadow to fall on the scale at a point midway between the shadow reading when the compass indicated heading east and the zero mark of the scale. The carrier is then heading correct magnetic east and the compass error can be corrected to show correct magnetic east in the usual way by adjusting compensating magnets near or beneath it. This adjustment eliminates semicircular error due to the fore and aft component of the permanent and sub-permanent magnetism of the carrier on both east and west cardinal points. The process is then repeated on the two remaining opposite cardinal points (north and south), correcting the athwartship component of this force. Thereby all semicircular error is eliminated. In practice, it is well to repeat the entire process to check to see that the corrections have been properly made. If not fully corrected, the process should be repeated. The errors are corrected when the turning of the carrier through 180° by compass from one cardinal point to the opposite effects a shadow reading of zero on the scale.

After the compass has been corrected for error due to permanent and subpermanent magnetism on all cardinal points, then it may be corrected for error due to induced magnetism in horizontal symmetrically disposed soft iron which may be contained within the carrier. This error is known as the Quadrantal Error. To correct for this error, the carrier is headed on any cardinal point. Dial 3 is turned so that the shadow falls on zero of the scale 13. The carrier is then turned to the right or left 45° as indicated by the shadow on the scale. The difference between the 45° heading as indicated by the instrument and the heading as indicated by the compass is the Quadrantal Error. The compass is then corrected by adjusting the soft iron balls on either side of it so that it will indicate the correct reading. This single correction corrects for all Quadrantal Errors.

Figure 1:
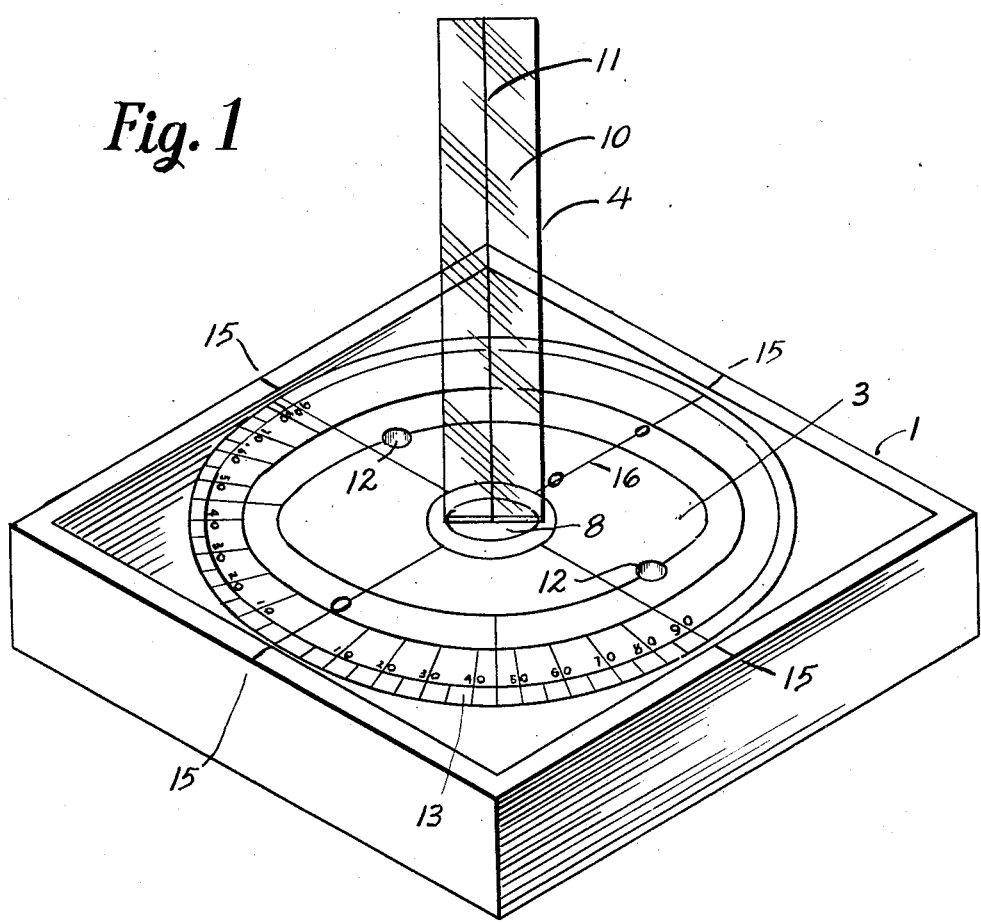
Figure 1 is a perspective view of the instrument.

When using the sun as the distant object in the manner described above, certain allowances must be made and precautions taken relative to determining the compass error due to the rotation of the earth and the changing of the sun in azimuth. Shifting of the dial to take care of this change in azimuth can be made after reference to azimuth tables; for example, in the northern hemisphere at about the 40th latitude, the following approximate changes in the dial should be made. Before 9:00 a. m. and after 3:00 p. m. Standard Time, the dial 3 should be turned clockwise one degree for every six minutes of time elapsed from the original setting of the dial (the making of the shadow line 16 to coincide with the shadow of line 11). To aid in this adjustment, markings 15 (see Figure 1) may be made on the edge of the instrument case 1 or the change may be made with respect to the shadow of the line 11. Between 9:00 a. m. and 10:30 a. m. or between 1:30 p. m. and 3:00 p. m., the dial 3 is turned clockwise one degree for every four minutes of time elapsed from the original setting of the dial. In view of the increased rate of the sun's change in azimuth between the hours of 10:30 a. m. and 1:30 p. m. and, further, in view of the shortening of shadow of line 11, it is better to avoid adjustment of compass during this time.

Similar precautions should be taken when adjusting the compass with a modification of my preferred instrument using any other celestial body besides the sun. However, as these precautions are necessary due to changes in the azimuth of the celestial bodies, such precautions may be avoided when a distant object on the earth is used for setting the instrument. With respect to variation in the structure of the instrument when such distant object or celestial body other than the sun is used, it is obvious that any means for sighting that body so as to align it through the center of the dial 3 and obtain a reading on the dial in the manner indicated above may be used. A cross-haired telescope revolving on an axis coinciding with line 11 with mechanical or optical means for making a reading on the dial is such an obvious equivalent, the adaptation of which would be within the skill of anyone having first the description of my invention.

It is seen that by the operation of my instrument, I effect the determination of the relative position of a distant object to a horizontal axis or the heading of the carrier. The setting of the dial 3 relative to the carrier and then rotating the carrier so as to change its heading effects the determination of the actual degrees of rotation of the carrier by merely sighting the distant object in the manner pointed out above when the rotation has been completed.

The above description of my invention is to be taken as illustrative only and not as limiting the scope thereof. Any modification or variation therefrom which conforms to the spirit of the invention is intended to be included within the scope of the claims.

I claim:

1. A process for determining error of the compass on carriers where such error is due to permanent and sub-permanent magnetism of the carrier which comprises setting up on the ship as a reference, a vertical shadow pin adapted to cast a shadow from the sun upon an accurate scale arranged about the base of the pin, which scale includes a diametrical base line, heading the ship on any cardinal point by the ship's compass and while so headed adjusting said scale to bring the shadow of the pin onto the base line, then turning the ship to head to the opposite of said cardinal point by ship's compass, noting the number of degrees that the shadow then departs from the base line, correcting the ship's compass by one-half of the number of degrees of departure from said base line.

2. A process for determining error of the compass on carriers where such error is due to permanent and sub-permanent magnetism of the carrier which comprises setting up on the carrier as a reference a sighting means adapted to determine through the center of the circle of a circular degree scale fixed on the carrier the directional degree reading on said scale of a distant object, heading the carrier on any cardinal point by the carrier's compass and while so headed noting the degree reading on said scale of a distant object, then turning the carrier to head to the opposite of said cardinal point by carrier's compass, noting by the sighting means the number of degrees that the carrier has rotated relative to the direction of said distant object, correcting the carrier's compass by one-half of the number of degrees of departure from 180 degrees rotation.

WALTER T. DARRACH.

REFERENCES CITED

The following references are of record in the file of this patent:

UNITED STATES PATENTS

| Number | Name | Date |
| --- | --- | --- |
| 517,029 | Clausen | Mar. 27, 1894 |
| 629,757 | Christensen | July 25, 1899 |
| 699,450 | Christensen | May 6, 1902 |
| 908,110 | Lihon | Dec. 29, 1908 |
| 978,093 | Weule | Dec. 6, 1910 |
| 1,401,205 | Sutter | Dec. 27, 1921 |
| 1,442,400 | Green | Jan. 16, 1923 |
| 2,335,771 | Konvalinka | Nov. 30, 1943 |

OTHER REFERENCES

Muir: "Navigation and Compass Deviations," Lord Baltimore Press, Balt., 1918, Chapt. 3, Sec. III.

War Dept.: TM 1—205 Air Navigation 1940, pp. 45–49.